United States Patent Office 3,833,678
Patented Sept. 3, 1974

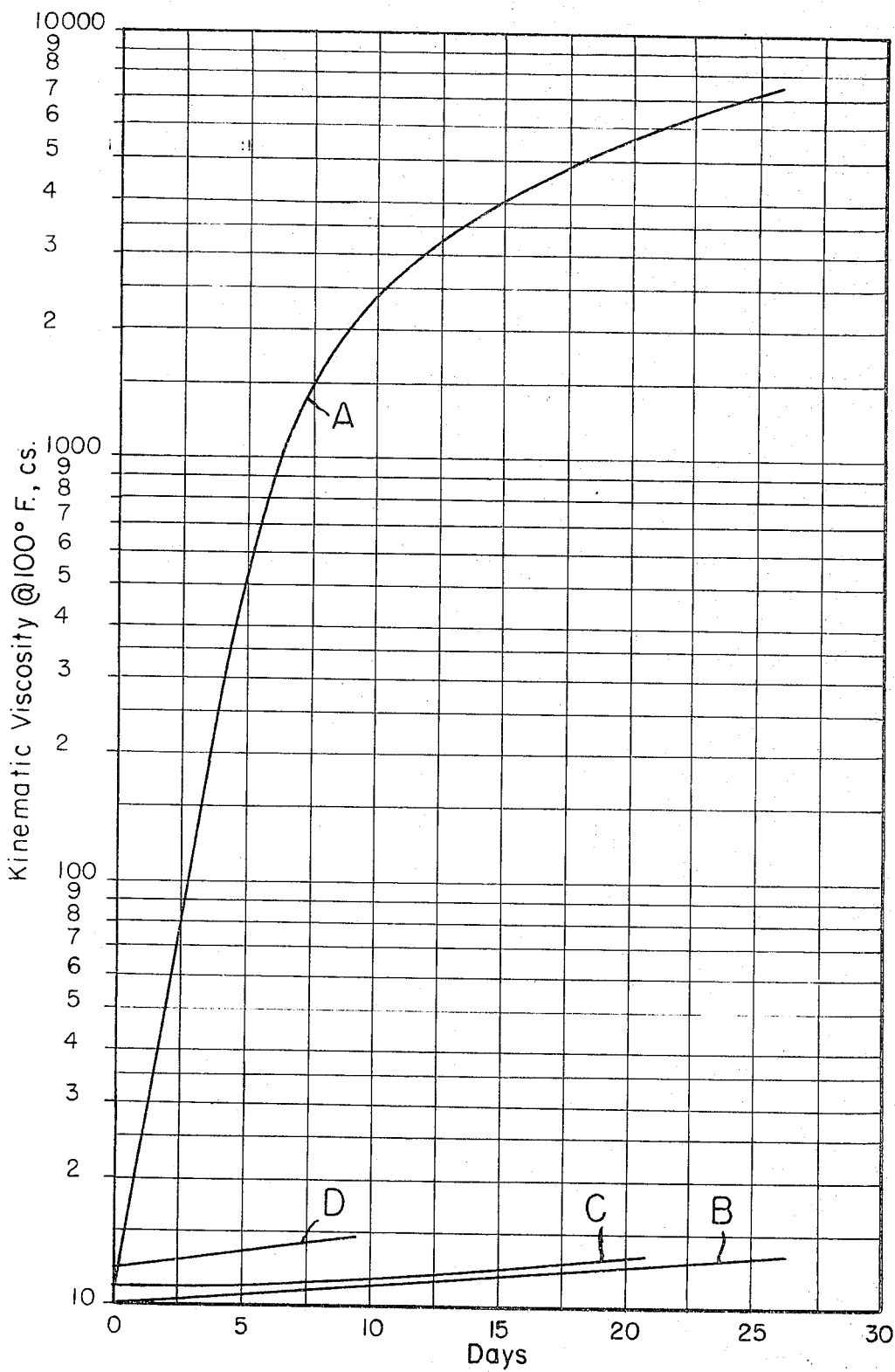

3,833,678
STABLE AND PUMPABLE LIQUID ALUMINUM
CHLORIDE AND BROMIDE COMPLEXES
James A. Brennan, Cherry Hill, N.J., assignor to
Mobil Oil Corporation
Continuation-in-part of application Ser. No. 41,709, May
27, 1970, now Patent No. 3,725,498, which is a continuation of application Ser. No. 745,415, July 17,
1968, which is a continuation-in-part of application
Ser. No. 598,564, Oct. 17, 1966, which in turn is a
continuation-in-part of application Ser. No. 334,394,
Dec. 30, 1963, all now abandoned. This application
Sept. 8, 1972, Ser. No. 287,303
Int. Cl. C07c 3/18
U.S. Cl. 260—683.15 B                12 Claims

ABSTRACT OF THE DISCLOSURE

Solutions of aluminum chloride or aluminum bromide, in molar excess, in methyl esters of certain normal and branched-chain alkanoic acids remain stable and pumpable at least 20 days or more. These solutions are useful catalysts for reactions, such as olefin polymerization or ethylation of isobutane, and can be recovered and recycled.

REFERENCES TO RELATED APPLICATIONS

This application is a continuation-in-part of copending application Ser. No. 41,709 filed May 27, 1970, now U.S. Pat. No. 3,725,498, a continuation of abandoned application Ser. No. 745,415 filed July 17, 1968, a continuation-in-part of abandoned application Ser. No. 598,564, filed Oct. 17, 1966, a continuation-in-part of abandoned application Ser. No. 334,394, filed Dec. 30, 1963.

BACKGROUND OF THE INVENTION

Field of the Invention

This invention relates to liquid aluminum halide catalysts that effect excellent control, uniformity, and reproducibility in reactions catalyzed by aluminum halide, and which remain stable and pumpable liquids over long periods of time.

Description of the Prior Art

As is well known to those familiar with the art, aluminum halides, particularly aluminum chloride and bromide, have been proposed as catalysts in many reactions, including polymerization, alkylation, and isomerization. As aluminum chloride (also aluminum bromide) is a solid, whereas the reactants are liquids, it has been difficult to control reactions and to obtain reproducible results. For example, the polymerization of olefins has been carried out by several methods, each of which has disadvantages: (1) All the olefin is added to the catalyst, resulting in an uncontrollable exothermic reaction. (2) The olefin is added slowly to the catalyst, which means that the catalyst concentration varies during the run. This adversely affects reproducibility. (3) The catalyst and olefin are metered separately, in the proper proportions, into the reaction vessel. Problems of metering solid material, however, make it difficult to maintain desired proportions of catalyst and olefin. Another disadvantage, common to all such procedures, is the difficulty inherent in obtaining uniform contact between solid catalyst and liquid olefin.

If, on the other hand, both the catalyst and reactants are liquid, uniform contact is attained and accurate metering is readily accomplished. Thus, the difficulties encountered in the use of solid aluminum chloride or bromide could be substantially eliminated, if the aluminum chloride or bromide could be obtained in a catalytically-active, liquid form. It has been proposed to dissolve (or complex) aluminum chloride in various solvents, such as alcohols, ethers, and methyl acetate. In each case, however, less than one mole of aluminum chloride was dissolved per mole of solvent. Such molar ratio solutions were not catalytically active.

In application Ser. No. 334,394 it was generally disclosed that catalyst solutions containing more than one mole of an aluminum halide dissolved in certain esters could be used to polymerize olefins and that such solutions could be recycled to subsequent runs. It has also been proposed to isomerize n-pentane using $AlCl_3$ dissolved in ethyl acetate, decanting reaction product and re-using the catalyst solution in subsequent runs [Ind. & Eng. Chem., 42, 342 (1950)]. In both the aforementioned polymerization and isomerization recycling runs, the solvent was ethyl acetate and all runs were carried out within twenty-four hours.

It was found, as a result of pilot plant runs, that at temperatures of 20–25° C. the $AlCl_3$-ethyl acetate catalyst solution decomposed within 24–30 hours, with the evolution of HCl, to a hard solid. Hence, the catalyst "solution," as previously anticipated, was not recyclable over prolonged periods of several days or months. In application Ser. No. 598,564 it was disclosed that of many ester solvents for aluminum halide, ethyl propionate was the only ester found so far, which maintains the aluminum halide in liquid solution for prolonged periods, i.e., more than two days and up to a month or more.

Ethyl propionate solutions of aluminum halide were specifically disclosed in parent application Ser. No. 334,394 and in the corresponding French Pat. No. 1,433,373. It has now been found that solutions of more than one mole of aluminum halide in ethyl propionate, although remaining liquid and stable over prolonged periods of time, exhibit the disadvantage of a rapid increase in viscosity over a period of time. For example, at 100°F. (38° C.) the solution doubled in viscosity in less than 2 days. Such viscosity increase makes accurate metering difficult and, more significantly, increases the pumping power requirements (decreases pumpabilty) in using the solution. These factors, of course, result in decreased efficiency of a process in which such catalyst solution is used.

It is the discovery of this invention that methyl esters of n-butyric, n-valeric, n-hexanoic, isovaleric, trimethylacetic, 2-methylvaleric, 2-ethylbutyric, and 2-ethylhexanoic acids can be used to form aluminum halide solutions that do not have the aforedescribed viscosity and pumpability disadvantages.

SUMMARY OF THE INVENTION

In general, this invention provides a stable liquid aluminum halide catalyst for catalyzing reactions normally catalyzed by aluminum chloride or aluminum bromide and which has a catalytic activity similar to that of aluminum chloride or bromide alone, that comprises a methyl ester of n-butyric, n-valeric, n-hexanoic, isovaleric, trimethylacetic, 2-methylvaleric, 2-ethylbutyric, or 2-ethylhexanoic acid having dissolved therein aluminum chloride or aluminum bromide in an amount greater than one mole per mole of said ester.

This invention also provides a method for carrying out a reaction catalyzed by aluminum chloride or bromide that comprises carrying out said reaction in a reaction vessel, under reaction conditions, in the presence of a catalyst solution comprising aluminum chloride or bromide dissolved in the aforedefined ester in an amount greater than one mole per mole of said ester; separating from the effluent from said reaction vessel said catalyst solution; and recycling it to the reaction vessel, preferably, with make-up aluminum halide.

BRIEF DESCRIPTION OF THE DRAWING

The drawing presents curves on a semi-logarithmic scale showing the relationship between Kinematic Viscosity at 100° F. and the time in days upon storage of solutions of 1.3 moles of $AlCl_3$ dissolved in ethyl propionate, methyl n-butyrate, methyl n-valerate, and methyl n-hexanoate products.

DESCRIPTION OF SPECIFIC EMBODIMENTS

The catalyst of this invention is a solution or complex of an aluminum chloride or bromide in the aforedefined ester. The solution contains more than one mole aluminum chloride or bromide per mole of ester. In general, the amount of aluminum chloride or bromide dissolved per mole of ester will be between about 1.1 moles and about 1.4 moles. A 1:1 mole solution has little or no catalytic activity. The aluminum chloride or bromide in excess of one mole in the solution appears to be the component that imparts catalytic activity to the catalyst solution. Thus, the amount of solution employed to catalyze the reaction will be governed only by the need to provide sufficient excess (over one mole) aluminum chloride or bromide to catalyze the desired reaction that is ordinarily catalyzed by solid aluminum halide.

The solution of aluminum chloride or bromide in ester is formed readily. A 1:1 mole solution or complex readily forms at room temperature. This solution is capable of dissolving additional aluminum chloride or bromide at temperatures of 30–50° C. In order to avoid hydrolysis due to moisture, it is preferred to prepare the catalyst solution in a dry inert atmosphere, such as nitrogen or dry air.

The solvent ester, in accordance with this invention, is the methyl ester of certain alkanoic acids. The esters are contemplated are methyl esters of n-butyric, n-valeric, n-hexanoic, isovaleric, trimethylacetic, 2-methylvaleric, 2-ethylbutric, and 2-ethylhexanoic acids.

As indicated hereinbefore, the catalyst solution of this invention is utilizable to catalyze any reaction ordinarily catalyzed by solid aluminum chloride or bromide. Such reactions and their operating conditions are well known in the art. They include alkylation of aromatic compounds with olefins or aliphatic halides; hydration of olefins, and isomerization of paraffins.

Of particular interest is the continuous, with catalyst recycle, polymerization of olefins to liquid polymers useful as synthetic lubricants. This invention will be illustrated in connection with this polymerization. A wide variety of olefins can be polymerized with the stable catalyst solution of this invention. In general, they can contain between about two and twenty-five carbon atoms per molecule and can be straight chain or branched chain, with or without aromatic ring substituents. Although preferred olefins are the 1-olefins, olefins having internal double bonds are contemplated. The olefin reactant can be a single olefin or a mixture of olefins, of which the following are nonlimiting examples: ethylene; butene-1; isobutene; hexene; octene-2; 2-ethylhexene-1; decene-2; decene-1; undecene-1; dodecene-1; hexadecene-1; octadecene-1; octadecene-9; eicosene; tricosene-1; tetracosene-1; and triacontene-1.

The polymerization is carried out at temperatures of between about 0° C. and about 100° C. for a period of time of about 1–3 hours. Ordinarily it is carried out at substantially atmospheric pressure, but particularly with lower olefins, superatmospheric pressures sufficient to maintain liquid phase can be advantageously employed. The amount of catalyst employed will generally be about 1–5 percent, by weight of olefin, based on excess aluminum chloride. In some operations, in order to render polymer products less viscous and more readily handled, a solvent inert to the polymerization can be used. Suitable solvents include kerosene and paraffins, such as heptane, octane, isooctane, decane, etc.

Because the catalyst solution of this invention is a heavy liquid, the effluent from the reactor is permitted to stand quiety until the major amount of the catalyst solution has separated as a lower heavy layer, Alternatively a centrifuge may be used to speed the separation. This layer is recycled, with fresh aluminum chloride as needed. Then, the remaining polymer product can be washed free of any residual catalyst solution, dried, and freed of solvent and monomer by distillation.

The following examples demonstrate the preparation of catalyst solutions of aluminum halide in ethyl propionate and their use in polymerizing 1-olefins. They also show the equivalence of aluminum chloride and aluminum bromide within the contemplation of this invention. These examples appear in copending application Ser. No. 41,709.

EXAMPLE 1

A solution (1) was prepared by dissolving anhydrous aluminum chloride in ethyl propionate at room temperature, in a molar proportion, respectively, of 1.31:1. A week later, a solution (2) was prepared by dissolving 100 g. of decene-1 in 50 ml. isooctane and the solutions (1+2) were metered at 0.29 g./min. and 2.49 g./min., respectively over a fifty-four minute period, into a flask filled with stirrer, thermometer, and reflux condenser, the mixture in the flask being maintained at 50–56° C. After addition of the solutions were complete, the mixture was maintained at 50–56° C. for an additional hour.

Product work-up was as follows: The reaction mixture was contacted with 50 ml. of a 10% aqueous solution of HCl and the acid solution was separated and removed in a separatory funnel. Then the reaction mixture was washed (with intermediate phase separation and removal) with 100 ml. water, 125 ml. of 10% aqueous $Na_2CO_3$ solution, and then with water until neutral. The product was dried over $Na_2SO_4$ and solvent and monomer were removed by distillation. The yield of polymer oil was >90 g. or >90%. It had a K.V. (Kinematic Viscosity) of 29.36 cs. at 210° F. and of 290.9 cs. at 100° F.

EXAMPLE 2

A large batch of catalyst solution was prepared by dissolving $AlCl_3$ in ethyl propionate in a molar ratio of 1.31:1, respectively. In order to facilitate solution, the ethyl propionate was heated slightly above room temperature with agitation. This completely liquid solution was stored in a dry air atmosphere.

EXAMPLE 2A

Five days after the large batch solution was prepared, a portion was used to polymerize decene-1 using the method of polymerization and product work-up described in Example 1, at 50–56° C. Yield was >90% and the product oil had a K.V. of 33.16 at 210° F. and of 347.3 at 100° F.

EXAMPLE 2B

Eight days after the large batch solution was prepared, a run was made at 51–53° C. using the proportions of catalyst solution, decene-1, and isooctane as described in Example 1, up to work-up. Instead of washing the reaction mixture, it was placed in a separatory funnel, heated to 85° C. and maintained at that temperature while standing quietly for about two hours. A used catalyst solution ("sludge") separated as a lower layer and was withdrawn. This was stored under dry air and used in subsequent runs. The polymer oil product was washed and dried. It (>90% yield) had a K.V. of 37.72 cs. at 210° F. and of 410.2 cs. at 100° F.

EXAMPLE 2C

Three weeks after the large batch solution was prepared, a portion of it (still liquid) was used in a run at 51–54° C., using the proportions, procedure, and work-up described in Example 1. The product (>90% yield) had a K.V. of 37.72 cs. at 210° F. and 410.2 cs. at 100° F.

EXAMPLE 3

On the same days as the run of Example 2B, a portion of the sludge from the run was used in a run to polymerize decene-1. It was found that the sludge was about a 1:1 molar solution of $AlCl_3$ in ethyl propionate. Accordingly, 0.31 mole make-up $AlCl_3$ was added per mole ethyl propionate and dissolved. The resultant catalyst solution was used to polymerize decene-1, as described in Example 1. The product polymer (>90% yield) had a K.V. of 47.48 cs. at 210° F. and of 548.0 cs. at 100° F.

EXAMPLE 5

Seventeen and seven tenths grams (0.066 mole) of anhydrous aluminum bromide was dissolved in 5.82 g. (0.057 mole) of ethyl propionate (P–32657–1). A 20.4 g. portion of the above solution and 87 g. (0.62 mole) of 1-decene were metered separately and simultaneously during seventy-eight minutes into a flask fitted with addition tubes, stirrer, thermometer, and condenser and maintained at 30° C. After all components were added, the mixture was held at 30° C. for one hour. The reaction was stopped by pouring onto a mixture of ice and hydrochloric acid. It was transferred to a separatory funnel, washed with a 100 ml. portion of water with 100 ml. of 5% sodium bicarbonate, with water until neutral and then dried over anhydrous sodium sulfate. The monomer and dimer were removed by distillation at reduced pressure to yield 20.5 g. (23.6%) of a trimer plus oil of the following physical properties:

K.V. at 210° F., cs. _____ 26.4
K.V. at 100° F., cs. _____ 238.2
Viscosity Index, Method D–2270 _____ 152
M.W. _____ 1267

EXAMPLE 6

Thirty-five and four-tenths grams (0.132 mole) of anhydrous aluminum bromide were dissolved in 11.6 g. (0.113 mole) ethyl propionate. A portion of this solution was stored at room temperature in a dry atmosphere.

After five days storage, a polymerization was carried out as described in Example 5, using 23.52 g. of the stored solution (still liquid) and 100 g. (0.705 mole) of decene-1. There was obtained 76.7 g. (76.7%) of a trimer plus oil having the following properties:

K.V. at 210° F., cs. _____ 32.3
K.V. at 100° F., cs. _____ 311.4
Viscosity Index _____ 153

As was indicated hereinbefore, esters other than ethyl propionate were previously found ineffective to maintain $AlCl_3$ in solution longer than 24–30 hours. This is demonstrated in the following example.

EXAMPLE 7

A series of solutions was prepared by dissolving $AlCl_3$ in various esters, using slight warming above room temperature when needed, in a molar proportion of 1.32 moles $AlCl_3$ per mole ester. Each solution (or mixture) was observed at room temperature for physical state, i.e., whether liquid (L), solid (S), liquid+solid (L+S), immediately after addition of $AlCl_3$, one hour later, and twenty-four hours later. In the case of the sole effective solvent, in the series investigated, ethyl propionate an observation was made one month later. Pertinent data are set forth in Table I.

TABLE I

| Ester solvent | After addition | Physical state | | |
| --- | --- | --- | --- | --- |
| | | One hour | 24 hours | One Month |
| Ethyl formate | L+S | L+S | L+S | |
| Butyl formate | L* | (*) | | |
| Ethyl acetate | L | L | S | |
| Propyl acetate | L* | L* | L+S | |
| Isopropyl acetate | L* | | | |
| n-Butyl acetate | L | L* | S | |
| Isobutyl acetate | L* | L* | S | |
| sec-Butyl acetate | L* | (*) | L+S* | |
| n-Pentyl acetate | L* | L* | S | |
| Phenyl acetate | S | | | |
| Benzyl acetate | L+S | L+S | L+S | |
| Phenethyl acetate | L+S | L+S | L+S | |
| Ethyl propionate | L | L | L | L |

*Strong evidence of decomposition.

Upon further investigation, it was found that a class of esters besides ethyl propionate is operative to form solutions, as contemplated herein, that are liquid for three days and more. This is illustrated in the following example.

EXAMPLE 8

A series of solutions was prepared by dissolving $AlCl_3$ in various esters, using slight warming above room temperature where necessary, using a molar ratio of 1.3 moles $AlCl_3$ per mole ester. Each solution was observed initially, at room temperature, for physical appearance. Those that were liquid were observed periodically. The times set forth in Table II reflect the length of the time period over which each solution was observed and does not indicate that the solution became unstable at that time, as the length of the periods of observation varied.

TABLE II

| Alcohol | Acid | | | | | |
| --- | --- | --- | --- | --- | --- | --- |
| | Propionate | n-Butyrate | Valerate | n-Hexanoate | n-Octanoate | n-Nonanoate |
| Methyl | Solid | Liquid 90 days | Liquid 20 days | Liquid 17 days | Liquid 30 days | |
| Ethyl | Liquid 30 days | Liquid 3 weeks | | | | Liquid 2 weeks. |
| n-Propyl | Liquid 4 days | Liquid 10 days | | | | |
| n-Butyl | Insoluble | Insoluble | | | | |
| n-Pentyl | do | Unstable | | | | |

VISCOSITY CHANGE ON STORAGE

As has been indicated hereinbefore, aluminum halide solutions in methyl n-butyrate and in methyl n-valerate show a relatively small change in viscosity upon storage over long periods of time. On the other hand, solutions in ethyl propionate increase to a tremendous degree within a rather short period of time. This is demonstrated in the following:

EXAMPLES 9 THROUGH 12

Four solutions of $AlCl_3$, each in a different normal fatty acid ester, were prepared; each solution containing 1.3 moles $AlCl_3$ per mole of ester. The esters used are indicated in Table III. Each solution was stored at 100° F. over a period of days and periodically determinations were made for Kinematic Viscosity at 100° F. (ASTM D–445). The results of these determinations are set forth in Table III.

TABLE III

| | Kinematic viscosity at 100° F. | | | |
|---|---|---|---|---|
| Time, days: | Ethyl propionate | Methyl n-butyrate | Methyl n-valerate | Methyl n-hexanoate |
| 0 | 8.5 | 10.1 | 11.0 | 12.4 |
| 1 | | 10.2 | 11.0 | 12.5 |
| 2 | 43.1 | 10.4 | 11.0 | 12.6 |
| 4 | | | | |
| 5 | 585 | 10.6 | | |
| 6 | 980 | 10.8 | | |
| 7 | 1,770 | 10.9 | 11.3 | 13.7 |
| 8 | 2,174 | 11.0 | 11.5 | 14.1 |
| 9 | | | 11.7 | 14.4 |
| 19 | 5,411 | 12.5 | | |
| 21 | | | 13.1 | |
| 26 | 7,680 | 13.7 | | |

Based upon the data in Table III, curves were plotted showing the viscosity change with time. The drawing presents curves plotted on a semi-logarithmic scale showing the relationship between Kinematic Viscosity at 100° F. and time in days during storage of a solution of 1.3 moles $AlCl_3$ per mole of ethyl propionate (Curve A), of a solution of 1.3 moles $AlCl_3$ per mole of methyl n-butyrate (Curve B), of a solution of 1.3 moles $AlCl_3$ per mole of methyl n-valerate (Curve C), and of a solution of 1.3 moles $AlCl_3$ per mole of methyl n-hexanoate (Curve D). By inspection of these curves, it will be at once apparent that the solution in ethyl propionate underwent a rapid increase in viscosity, whereas the solution in methyl esters increased relatively little. For example, in 5 days ethyl propionate solution increased from about 8.5 cs. to about 585 cs. On the other hand, in 5 days, methyl n-butyrate solution increased from about 10 cs. to only about 11 cs.

Accordingly, aluminum halide solutions in ethyl propionate can not be used for long without an increase in pumping requirements to move it in recycle operation, i.e., it becomes less and less pumpable. On the other hand, solutions in methyl n-butyrate, methyl n-valerate, and methyl n-hexanoate remain pumpable. This makes for much more efficient process operation.

In previous applications of this series, it has been indicated that the acid portion of the ester solvents must be a normal acid. It is generally believed that branched-chain acids are, ineffective, as has been indicated hereinbefore, however, certain branched-chain acid esters have been found to be effective, stable solvents which remained pumpable. This will be apparent from the following examples:

EXAMPLES 13 THROUGH 17

Five solutions of $AlCl_3$, each in a different branched-chain fatty acid ester, were prepared; each solution containing 1.3 moles $AlCl_3$ per mole of ester. The esters used are indicated in Table IV. Each solution was stored at 100° F. over a period of days and periodically, determinations were made for Kinematic Viscosity at 100° F. (ASTM D–445). The results of these determinations are set forth in Table IV.

TABLE IV

| | Kinematic viscosity at 100° F., cs. | | | | |
|---|---|---|---|---|---|
| Time, days | Methyl isovalerate | Methyl trimethyl acetate | Methyl 2-methyl valerate | Methyl 2-ethyl butyrate | Methyl 2-ethyl hexanoate |
| 0 | 11.4 | 14.9 | 12.0 | 13.8 | 17.4 |
| 1 | 11.3 | 14.6 | 11.8 | | |
| 2 | 11.3 | 14.7 | 11.9 | 13.9 | 17.2 |
| 3 | 11.4 | 14.7 | 11.9 | 13.8 | 17.4 |
| 4 | 11.5 | 14.7 | 12.0 | 13.8 | 17.5 |
| 7 | | | | 14.1 | 17.9 |
| 9 | | | | 14.1 | 18.3 |
| 11 | | | | 15.5 | 18.4 |
| 14 | 12.8 | 14.9 | 12.8 | 14.5 | 19.0 |
| 15 | 13.0 | 15.0 | 12.9 | | |
| 16 | 13.1 | 15.0 | 12.9 | | |
| 17 | 13.3 | 15.0 | 13.0 | | |
| 18 | 13.4 | 15.0 | 13.0 | 14.9 | 19.4 |
| 21 | 13.8 | 15.0 | 13.3 | | |
| 22 | 14.0 | 15.0 | 13.3 | | |
| 23 | 14.1 | 15.1 | 13.4 | | |
| 28 | 14.9 | 15.2 | 13.9 | | |
| 31 | 15.5 | 15.2 | 14.1 | | |

From the data in Table IV, it is at once apparent that solutions of aluminum halide in the esters set forth therein remain stable and pumpable over prolonged periods. It will also be seen that were the data in Table IV plotted, the curves would be of the same order as curves B, C, and D in the drawing.

ALKYLATION OF ISOPARAFFINS

Another important utilization of the catalyst solutions described herein, is the ethylation, i.e., alkylation of isobutane. Such ethylation has been found to produce significant amounts of diisopropyl (2,3-dimethylbutane) which has a high blending Octane Number. It will be appreciated that such components having high blending Octane Number without the use of lead, are valuable components in lead-free gasolines; and, therefore, contribute to the diminishing of pollution attributed to leaded gasoline.

Diisopropyl is the kinetc product from acid catalyst ethylation of isobutane. However, unless reaction conditions are controlled, secondary reactions present, which result in the formation of $C_8$ and higher paraffins. Also, cracking with the subsequent addition of ethylene to the fragments and yield molecules with an odd number of carbon atoms. Such secondary reactions direct from the octane quality of the total output.

The catalysts contemplated for the ethylation process herein described are solutions of aluminum chloride or aluminum bromide in a concentration of 1.1 to 1.4 moles aluminum halide per mole of ester. The contemplated esters utilizable are those set forth in Tables III and IV. Methyl n-butyrate and methyl n-valerate are preferred.

Although it is not essential, an alkyl halide promoter can be used, such as ethyl chloride, hydrogen chloride, and t-butyl chloride. The amount of promoter used will be between about 0 and about 0.85 mole promoter per mole of active aluminum halide catalyst. By the term "active aluminum halide" reference is made to the amount of the aluminum halide present in the ester solutions in excess of 1 mole equivalent of ester.

Although the ethylation reaction can be carried out batch-wise, it is more feasibly and economically carried out in a continuous process. Such operation will be utilized in demonstrating the process of this invention.

The catalyst concentration will vary between about 1.0 and about 5 percent, based upon the isobutane charged. The alkylation temperature will be between about 70° F. and about 200° F. The residence time can vary with agitation up to about 60 minutes. The molar ratio of isobutane to ethylene will be between about 5 and 10.

The continuous ethylation of isobutane as described in the following examples was carried out in a 300 ml. steel autoclave. More advantageously, the reaction can also be practiced in any type reactor which will provide intimate mixing such as a thin film reactor. In all runs, the initial ethylene ($C_2^=$) pressure and reactor temperature were established. Ethylene flow rate was adjusted to maintain the initial ethylene pressure. Then, isobutane and catalyst solution (methyl n-butyrate) were metered separately and put simultaneously into the reactor. Residence times were established by pumping rates. The rate of withdrawal of effluent reaction mixture was adjusted to match the rate of addition of fresh isobutane and catalyst. The reaction effluent was transferred to a steel vessel wherein catalyst solution separated by gravity and was withdrawn. Raw alkylate product was permitted to stand at room temperature so that almost all unreacted isobutane and ethylene were removed therefrom, before alkylate analyses were made.

EXAMPLES 17 THROUGH 22

A series of runs were carried out for the ethylation of isobutane using the aforedescribed general procedure. In each run, conditions were varied within the aforedescribed ranges of reaction conditions. When a promoter was use, it was ethyl chloride. Pertinent process, conversion, yields and unleaded research Octane Number are set forth in Table IV. In Table V the product distribution of the alkylate produced in Examples 12 and 13 are set forth.

TABLE IV

| Example | 17 | 18 | 19 | 20 | 21 | 22 |
|---|---|---|---|---|---|---|
| Temp., °F | 73 | 72 | 200 | 128 | 121 | 120 |
| Starting press. ($C_2^=$), p.s.i.g | 200 | 60 | 300 | 120 | 150 | 150 |
| Residence time, min | 30 | 30 | 30 | 30 | 30 | 30 |
| Isobutane/$C_2^=$, mol | 9.8 | 9.5 | 9.3 | 9.7 | 4.9 | 5.0 |
| G. free $AlCl_3$/100 g. $iC_4$ | 5.0 | 5.0 | 2.4 | 2.6 | 5.0 | 4.9 |
| Promoter/free $AlCl_3$, mol | .25 | .26 | .28 | .51 | .25 | None |
| Stirrer, r.p.m | 600 | 600 | 600 | 600 | 600 | 1,000 |
| Ethylene conv., wt. percent | 91.5 | 62.0 | 61.9 | 61.1 | 78.5 | 76.8 |
| $C_8$ in alkylate, wt. percent ᵃ | 70.0 | 83.5 | 78.8 | 84.8 | 76.9 | 81.2 |
| Mini micro RON, clear | 99.2 | 101.8 | 99.5 | 101.8 | | |

ᵃ G.C. analysis of washed alkylate.

TABLE V

| Alkylate composition ᵃ | | Example 17 | | Example 18 | |
|---|---|---|---|---|---|
| $iC_5$ | | 0.6–0.6 | | 0.2–0.2 | |
| $C_6$ | 2,2 DMB | 0.1 | | 1.0 | |
| | 2,3 DMB | 67.5 | -73.0 | 79.4 | -87.8 |
| | 2-MP | 4.0 | | 5.4 | |
| | 2-MP | 1.4 | | 2.0 | |
| $C_7$ | 2,2,3-TMB | 0.2 | | — | |
| | 2,3-DMP | 0.1 | | — | |
| | 2,4-DMP | 2.0 | -2.9 | 0.9 | -1.4 |
| | 2-M Hex | 0.4 | | 0.5 | |
| | 3-M Hex | 0.2 | | — | |
| $C_8$ | 2,5-DM Hex | 1.7 | | 1.3 | |
| | 2,3 DM Hex+2M, 3EtP | 1.0 | | 0.9 | |
| | 2,4 DM Hex+2,2,3 TMP | 2.9 | | 1.7 | |
| | 2,2,4 TMP | 7.7 | -16.7 | 3.6 | -9.1 |
| | 2,3,4 TMP | 1.2 | | 0.5 | |
| | 2,3,3 TMP | 2.2 | | 1.1 | |
| | Residue | 6.8–6.8 | | 1.4–1.4 | |
| Alkylate RON clear. | | 99.2 | | 101.8 | |

ᵃ G.C. analysis of pod bottoms.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A stable liquid aluminum halide catalyst for catalyzing reactions normally catalyzed by aluminum chloride or aluminum bromide and which has a catalytic activity similar to that of aluminum chloride or bromide alone, that comprises a methyl ester of n-butyric, n-valeric, n-hexanoic, isovaleric, trimethylacetic, 2-methylvaleric, 2-ethylbutyric or 2-ethylhexanoic acid having dissolved therein aluminum chloride or aluminum bromide in an amount greater than one mole per mole of said ester.

2. A liquid catalyst defined in Claim 1, wherein said ester has dissolved therein between about 1.1 moles and about 1.4 moles aluminum chloride per mole ester.

3. A liquid catalyst defined in Claim 2, wherein said ester is methyl n-butyrate.

4. A liquid catalyst defined in Claim 2, wherein said ester is methyl n-valerate.

5. A liquid catalyst defined in Claim 2, wherein said ester is methyl isovalerate.

6. A liquid catalyst defined in Claim 2, wherein said ester is methyl trimethylacetate.

7. A liquid catalyst defined in Claim 2, wherein said ester is methyl 2-methylvalerate.

8. A method for carrying out a reaction catalyzed by aluminum chloride or bromide that comprises carrying out said reaction in a reaction vessel, under reaction conditions, in the presence of said catalyst in a methyl ester of n-butyric, n-valeric, n-hexanoic, isovaleric, trimethylacetic, 2 - methylvaleric, 2 - ethylbutyric, or 2-ethylhexanoic acid in an amount greater than one mole per mole of said ester; separating from the effluent from said reaction vessel said catalyst solution; and recycling it to the reaction vessel with make-up aluminum chloride or bromide.

9. The method defined in Claim 8, wherein said reaction is the polymerization of olefins.

10. The method defined in Claim 8, wherein said reaction is the alkylation of isobutane with ethylene.

11. A method for polymerizing olefins that comprises contacting, in a reaction vessel, said olefins with a catalyst solution of methyl n-butyrate having dissolved therein between about 1.1 moles and about 1.4 moles aluminum chloride per mole methyl n-butyrate; withdrawing an effluent stream from said reaction vessel; separating said catalyst solution from said effluent; and recycling said catalyst solution to said reaction vessel with make-up aluminum chloride.

12. A method for alkylating isobutane that comprises contacting, in a reaction vessel, a mixture of said isobutane and ethylene with a catalyst solution of methyl n-butyrate having dissolved therein between about 1.1 moles and about 1.4 moles aluminum chloride per mole methyl n-butyrate; withdrawing an effluent stream from said reaction vessel; separating said catalyst solution from said effluent; and recycling said catalyst solution to said reaction vessel with make-up aluminum chloride.

References Cited

FOREIGN PATENTS 1,433,373  2/1966  France _____ 260—683.15

PAUL M. COUGHLAN, Jr., Primary Examiner

U.S. Cl. X.R.

252—429R; 252—442; 260—683.53

PO-1050
(5/69)

UNITED STATES PATENT OFFICE
CERTIFICATE OF CORRECTION

Patent No. 3,833,678  Dated September 3, 1974

Inventor(s) JAMES A. BRENNAN

It is certified that error appears in the above-identified patent and that said Letters Patent are hereby corrected as shown below:

| | | |
|---|---|---|
| Column 4, line 18 | "quitly" should be | --quietly--. |
| Column 4, line 39 | "filled" should be | --fitted--. |
| Column 8, line 11 | "15.5" should be | --15.0--. |
| Column 8, line 37 | "kinetc" should be | --kinetic--. |

Signed and sealed this 18th day of February 1975.

(SEAL)
Attest:

RUTH C. MASON
Attesting Officer

C. MARSHALL DANN
Commissioner of Patents
and Trademarks